June 17, 1952  D. MARIANI ET AL  2,600,790
VARIABLE NUMBER INDICATOR
Filed July 6, 1950
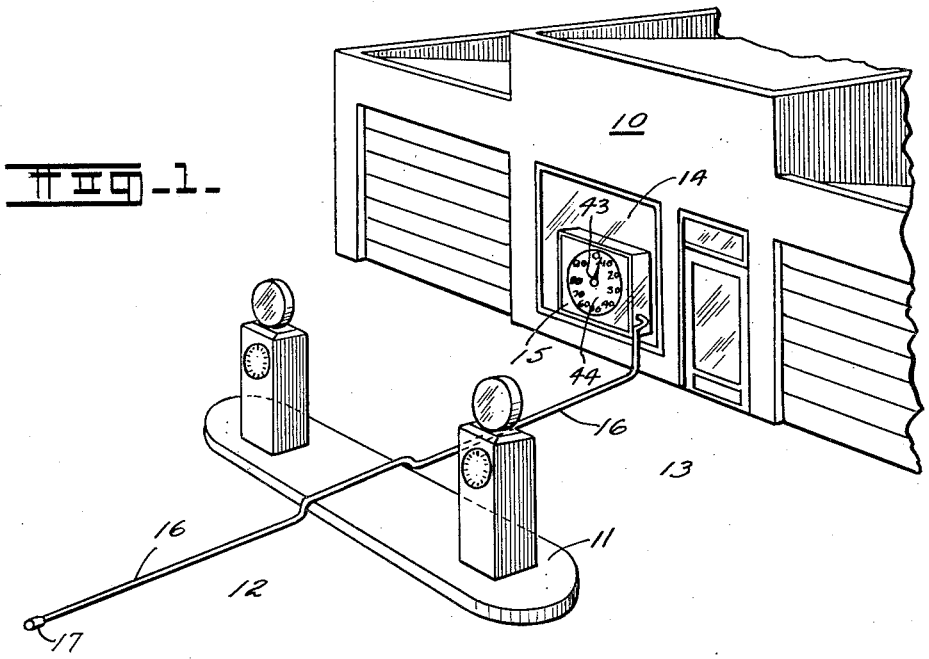
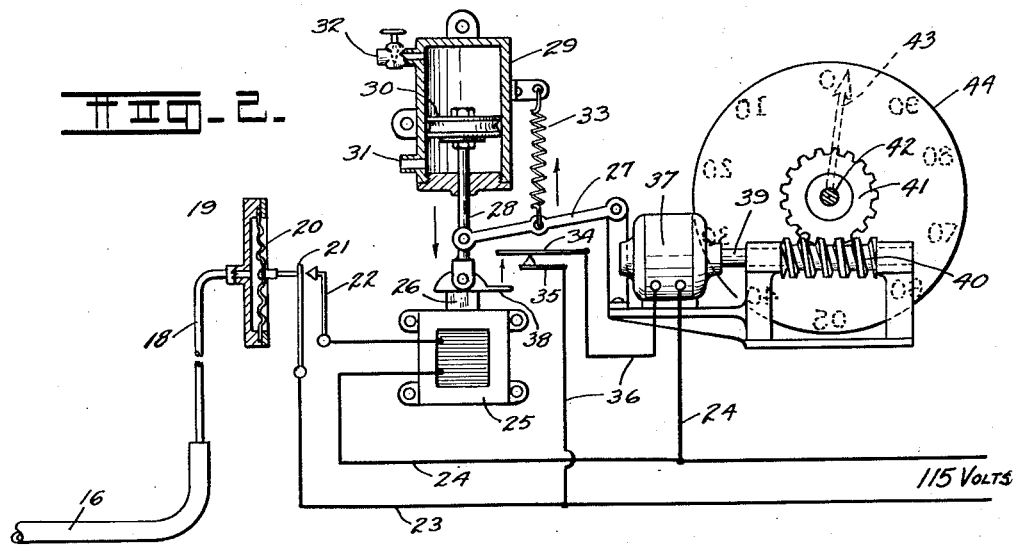
INVENTORS;
Dominic Mariani
Joseph A. Patasce.
George Roebuck.
By W. B. Harpman
ATTORNEY.

… … …

UNITED STATES PATENT OFFICE 2,600,790

VARIABLE NUMBER INDICATOR

Dominic Mariani, Joseph A. Patasce, and George Roebuck, Youngstown, Ohio

Application July 6, 1950, Serial No. 172,216

1 Claim. (Cl. 273—141)

This invention relates to indicators and more particularly to a variable indicator for use in indicating various numbers and responsive to a predetermined energizing act.

The principal object of the invention is the provision of a variable number indicator whereby various displayed numbers or other indicia may be indicated.

A further object of the invention is the provision of a variable number indicator and actuating mechanism therefor particularly adapted for use in sales promotion and the like.

A still further object of the invention is the provision of a variable number indicator having a simply constructed, easily actuated mechanism for varying the indicating action of an indicator member therewith.

A still further object of the invention is the provision of a variable number indicator mechanism including manually operable means for varying the actuating cycle of the mechanism.

The variable number indicator disclosed herein comprises a device adapted for use in facilitating sales promotion and particularly with respect to gasoline stations and the like whereby potential purchasers entering an equipped gasoline station will actuate the variable number indicator to cause one of a plurality of desirable indicia on the indicator to be indicated, the indicated number resulting comprising a chance selection which may be utilized in awarding free merchandise. For example, a motor vehicle having a license number including the number 50 enters the gasoline station equipped with the variable number indicator and drives over an actuating device to actuate the variable number indicator. If the variable number indicator indicates the number 50, the driver of the vehicle is then awarded free merchandise or a suitable prize, as desired.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein:

Figure 1 is a perspective view of a gasoline station showing the variable number indicator installed therein.

Figure 2 is a schematic view of the variable number indicator mechanism with parts broken away and parts in cross section.

By referring to the drawings and Figure 1 in particular it will be seen that a gasoline station is illustrated and includes a building 10, an island 11 and driveways 12 and 13, the variable number indicator being positioned in a window 14 of the building 10 and generally indicated by the numeral 15. An actuating device such as a pneumatic hose 16 is extended across the driveways 12 and 13 of the gasoline station and the outermost end of the hose 16 is closed as by a closure 17.

As disclosed in the schematic view comprising Figure 2 of the drawings the actuating mechanism comprises the pneumatic hose 16, the inner end of which is connected by means of tubing 18 with a diaphragm case 19 and with the area in the diaphragm case 19 on one side of a diaphragm 20. It will thus be seen that a motor vehicle entering the driveway 12 or 13 of the gasoline station, shown in Figure 1 of the drawings, will compress the hose 16 and thereby cause the diaphragm 20 to move outwardly with respect to the diaphragm case 19 and close an electrical switch element 21 and a contact 22 to establish an electrical circuit through wires 23 and 24 between a power supply, such as a 115 volt supply line, and a solenoid 25. The switch element 21 is normally open with respect to the element 22 and the solenoid 25 is thereby normally de-energized.

A plunger 26 of the solenoid 25 is pivotally connected with an operating arm 27 and a piston rod 28, the opposite end of the piston rod 28 being enclosed in a cylinder 29 which in turn encloses a piston 30 secured to the piston rod 28. An opening 31 in the cylinder 29 permits the piston 30 to move downwardly rapidly when the plunger 26 of the solenoid 25 moves downwardly in response to the actuation thereof. A valved opening 32 in the upper portion of the cylinder 29 results in slowing down the upward motion of the piston 30 when the solenoid 25 is de-energized and the piston 30 and the arm 27 moved upwardly by reason of a coil spring 33 connected between the operating arm 27 and the cylinder 29. A movable switch element 34 is positioned above a fixed switch contact member 35 in a circuit wire 36 which connects with an electric motor 37.

An extension 38 on the plunger 26 of the solenoid 25 is arranged to lift the movable contact member 34 when the plunger 26 is moved upwardly responsive to the action of the coil spring 33. The switch element 34 is therefore normally open with respect to the fixed contact 35 and the motor 37 is de-energized. The electric motor 37 is provided with a shaft 39 carrying a worm gear 40 which is operatively engaged with a pinion 41 on a secondary shaft 42. The shaft 42 carries an indicator member 43 which is revolvable in the manner of a hand on a clock with respect to a dial 44 having suitable indicia circumferentially spaced thereon as shown in Figures 1 and 2 of the drawings. It will thus be seen that when the motor 37 is actuated, the motion of the shaft 39 thereof is imparted to the indicating member 43 which moves with respect to the circumferentially spaced indicia on the dial 44.

In operation, an automobile entering the gasoline station and compressing the pneumatic hose 16 causes the diaphragm 20 to move to momentarily close the switch element 21 and contact 22. The speed of the automobile passing over the pneumatic hose 16 varies the time the switch element 21 is closed with respect to the contact 22. The solenoid 25 is actuated for a period of time corresponding with the closing of the switch element 21 with the contact 22 and the plunger 26 is moved downwardly a comparable distance and the switch elements 34 and 35 closed a comparable period of time. Upon the de-energization of the solenoid 25 the plunger 26 is moved upwardly by the spring 23 at a rate determined by the seating of the valved opening 32 in the cylinder 29 and the switch elements 34 and 35 held open an additional period of time.

It will thus be seen that when the plunger 26 is first moved downwardly, the switch element 34 engages the fixed contact 35 and the motor 37 is thereby actuated. The hand 43 revolves with respect to the indicia on the dial 44. When the plunger 26 has moved upwardly a predetermined distance and engages the movable switch element 34 and lifts the same from the contact 35, the operation of the motor terminates and the indicating member 43 stops its revolving motion and indicates one of the circumferentially spaced indicia on the dial 44.

It will occur to those skilled in the art that several features thus determine the length of time in which the electric motor 37 is operating and hence the location at which the indicating member 43 is likely to stop. One of these variable elements is found in the length of time the diaphragm 20 holds the switch element 21 against the fixed contact 22, as this time element controls the positioning of the plunger 26 of the solenoid 25 and the motor 37 is controlled by the switch element 34 which is engaged with the fixed contact 35 whenever the plunger 26 is held down by the solenoid 25.

The second variable element is found in the cylinder 29 in the valved opening 32 thereof as the speed or return movement of the plunger 26 of the solenoid 25 is directly controlled by the rapidity of air exhausted through the opening 32. Thus, the length of time the motor 37 operates is influenced by this latter operation, as the plunger 26 cannot begin its upward travel until the solenoid 25 is de-energized and the rate of its upward movement is controlled by the valved opening 32. As the plunger 26 must move a predetermined distance upwardly before it engages the switch element 34, the second variable control has influenced the time the motor 37 will be energized.

It will thus be seen that the several objects of the invention are met by the device disclosed in that a variable number indicator suitable for the intended purpose is set forth and the variation inherent in its operation results in a desirable chance selection of the finally indicated number.

Having thus described our invention, what we claim is:

A variable number indicator comprising a dial having indicia circumferentially spaced thereon, an indicia indicator rotatably positioned on said dial and a motor for driving said indicia indicator, a power source for said motor and variable switch means including movable contacts for electrically connecting said power source with said motor, said variable switch means also including a diaphragm switch and a pneumatic actuator for closing said diaphragm switch, a solenoid responsive in operation to said diaphragm switch and an air piston and cylinder assembly connected with and responsive in operation to said solenoid, means biasing the piston of the said air piston and cylinder assembly away from said solenoid, said movable contacts positioned adjacent said solenoid and normally held in open position by said solenoid as biased by said biasing means, and movable to closed position when said solenoid is operated by actuation of said diaphragm switch.

DOMINIC MARIANI.
JOSEPH A. PATASCE.
GEORGE ROEBUCK.

REFERENCES CITED

The following references are of record in the file of this patent:

UNITED STATES PATENTS

| Number | Name | Date |
|---|---|---|
| 1,947,810 | Starr | Feb. 20, 1934 |
| 2,123,382 | Rocher | July 12, 1938 |
| 2,188,948 | Huebner | Feb. 6, 1940 |
| 2,340,634 | Wiley | Feb. 1, 1944 |

FOREIGN PATENTS

| Number | Country | Date |
|---|---|---|
| 297,536 | Great Britain | Sept. 27, 1928 |